Dec. 18, 1945.  W. NOBLE  2,391,186

AIR COOLED REDUCTION GEAR UNIT

Filed June 12, 1943  2 Sheets-Sheet 1

INVENTOR.
WARREN NOBLE
BY Oberlin, Limbach & Day
ATTORNEYS

Dec. 18, 1945. W. NOBLE 2,391,186
AIR COOLED REDUCTION GEAR UNIT
Filed June 12, 1943 2 Sheets-Sheet 2

INVENTOR.
WARREN NOBLE
BY
Oberlin, Limbach & Da
ATTORNEYS

Patented Dec. 18, 1945

2,391,186

UNITED STATES PATENT OFFICE 2,391,186

AIR-COOLED REDUCTION GEAR UNIT

Warren Noble, Cleveland, Ohio, assignor to The Cleveland Worm & Gear Company, Cleveland, Ohio, a corporation of Ohio Application June 12, 1943, Serial No. 490,601

10 Claims. (Cl. 74—606)

The present invention relates to an air cooled machinery housing unit, such as a reduction gear, wherein an oil bath or lubricant reservoir is provided for a body of oil which is circulated about, and comes in contact with the moving parts. During the course of such contact, the heat of friction generated by gears, bearings and the like, is transmitted to the oil, and the latter medium in turn gives up its heat through the machinery housing walls. The operating temperature and hence the power rating of a machinery unit, such as a worm and gear reduction unit, is thus dependent, in a substantial measure, upon the rate at which the so generated and transmitted heat of friction is dissipated to the exterior atmosphere. Heretofore forced air convection means, such as a fan mounted on the machine drive shaft exteriorly of the machine housing, have been utilized to draw air from the surrounding atmosphere and force it past that portion of the housing in which the oil reservoir is located.

The oil is at its highest temperature immediately after contact with the surfaces of the machinery where the heat of friction is generated. This relatively hotter oil is then most usually thrown off from the rotating machine parts, such as the gears and shafts, to impinge upon the interior housing walls and thence to drain by gravity back into the main body or reservoir of oil.

It is a well known principle that the rate of heat transfer is generally proportional to the difference in temperature or "thermal head" between the bodies or materials serving as the heat exchanging elements. Furthermore, it is also known that lubricating oils generally undergo a decrease in viscosity in proportion to increased temperature. Accordingly, the relatively hotter oil draining down the sides of the housing walls, being also relatively more fluid and mobile, is susceptible of a greater rate of heat transfer, i. e., can be more rapidly and efficiently cooled, than the relatively cooler and more viscous oil in the main body or mass collected in the lubricant reservoir.

A forced air convection means, such as a fan, necessarily results in a compressive action upon the air, which in turn generates heat of compression in the gaseous medium, namely, the air, passing through it. Thus, the temperature of the air on the discharge side of a fan is slightly greater than the temperature of the air on the intake side of the fan.

It is, therefore, the general object and nature of my present invention to provide means for air cooling a machinery housing of the nature indicated wherein the cooler air, namely, that on the intake or suction side of the air propelling means passes over the exterior portions of the machine housing upon whose inner walls the relatively hotter and less viscous oil is flowing and draining; and wherein the relatively hotter air from the air propelling means is passed along those portions of the housing walls in which the relatively cooler and less mobile, main body of oil is contained. It is a further object of my invention to reverse the general direction of flow of the air as it passes over the outer walls of the housing, thus increasing the turbulence of the air and increasing the efficiency of its heat absorption.

My invention possesses the further object and advantage, particularly in the case of a worm gear reduction unit, of directing the incoming, relatively cooler air past the thrust bearing on the worm shaft, so that the thrust bearing, which, due to its comparatively increased load and hence its operation at a temperature relatively higher than other moving parts of the unit, has ample opportunity to dissipate its generated heat to the cooling air stream sweeping around it.

Briefly outlined, my invention provides an air propelling means, such as a fan, mounted on the exterior of the machinery housing which contains the lubricant bath or reservoir, with an air intake passageway to the fan located along the portions of the housing wall upon which the relatively hotter lubricant impinges, and an air discharge passageway from the fan located along the lower housing wall portion in which the main body of relatively cooler oil is contained.

Additional objects and advantages of my invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Figures 1, 2:
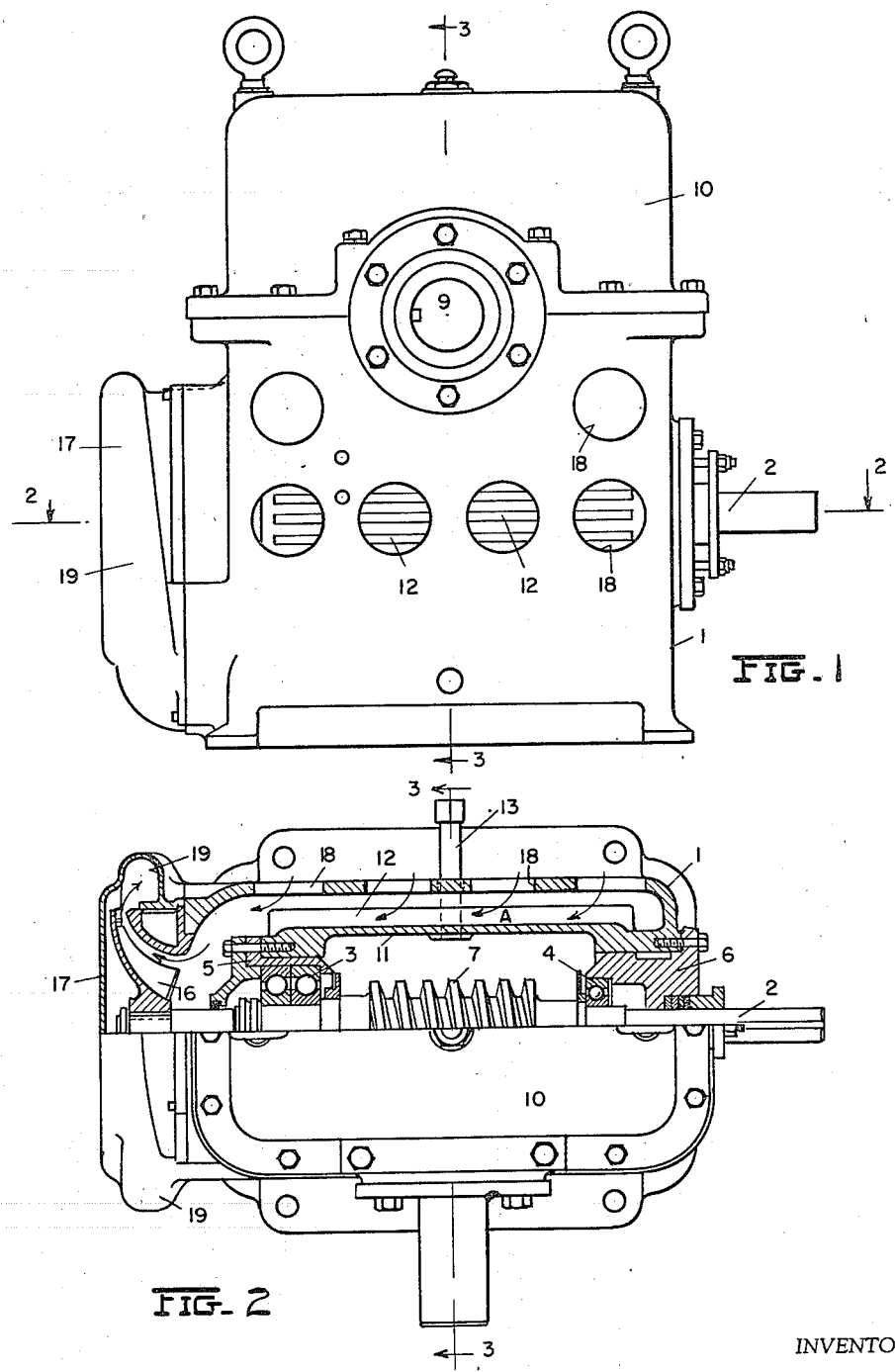
Fig. 1 is an elevational side view of a machinery housing unit, specifically a worm gear reduction unit, embodying the principle of my invention.
Fig. 2 is a top plan view which is half-sectioned along line 2—2 of Fig. 1.
Figure 4:
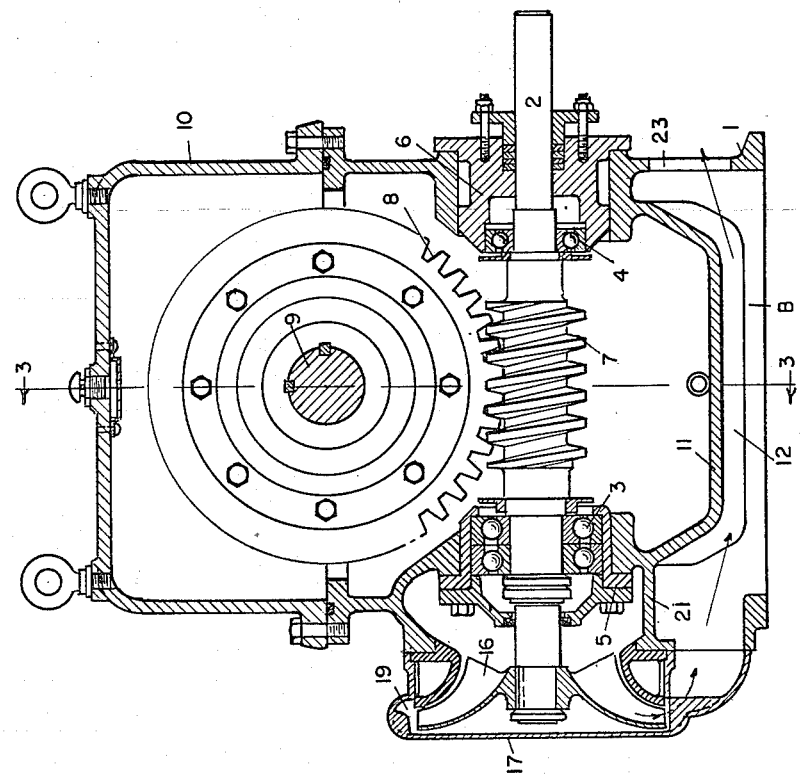
Figure 3:
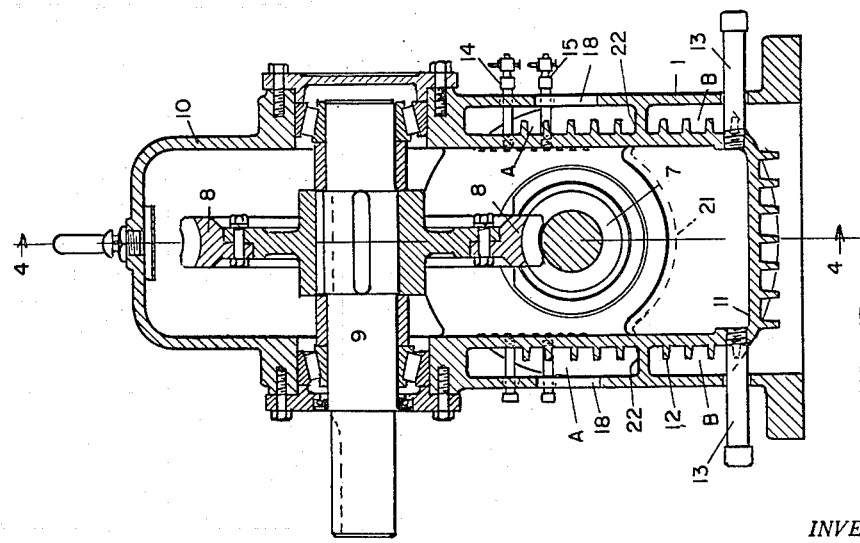

Fig. 3 is a vertical, sectional view taken substantially along the lines 3—3 of Figs. 1, 2 and 4; and Fig. 4 is a vertical, sectional view taken upon a plane normal to that of Fig. 3 and substantially along line 4—4 of Fig. 3.

Now referring more particularly to the drawings, there are shown therein a main supporting base 1 in which the high speed or drive shaft 2 of the worm gear reduction unit is journaled in the bearings 3 and 4; these bearings in turn being mounted in the removable supporting cups 5 and 6, respectively. The bearing 3 is the thrust bearing which carries the axial end thrust from the worm shaft 2 in addition to the radial load, and is thus a source of substantial heat generation in the unit.

The worm 7 on the shaft 2 engages with the worm gear 8 carried by the driven shaft 9 journaled in suitable bearings contained in the upper housing member 10.

An inner housing 11 depends from the top of the lower housing or base member 1 and is inwardly spaced therefrom along its side, bottom and end walls. As best shown in Fig. 3, radiant fins 12 project outwardly from the walls of the inner housing 11 and into the space inside of the lower housing 1. The inner housing 11 serves as a lubricant reservoir containing an oil bath surrounding the shaft 2 and worm 7. Drain pipes 13 extend from the bottom of the inner housing 11 out through the main housing 1. Upper and lower liquid level inspection pipes 14 and 15, respectively, with suitable pet cocks, project outwardly from the upper portion of the inner housing 11 through the main housing 1; and serve as means for checking the level of the oil bath where the worm 7 and gear 8 are intended to be so operated that their contact zone is submerged in the lubricant. In the case of low oil level operation, e. g., where the oil level in the lubricant reservoir is maintained below the worm 7 and oil pumped or otherwise circulated therefrom to the moving parts, the pipes 14 and 15 may be omitted.

A centrifugal fan 16 is mounted on the left-hand end of the drive shaft 2 and is completely enclosed by the fan housing 17. Intake openings 18 are located in the outer housing 1, whereby the intake air to the fan 16 is drawn in through such openings into the space between the upper side walls of the inner housing 11 and outer housing 1, as best indicated by the arrows in Fig. 2. This stream of cooling air, as will be seen from Figs. 2 and 4, also flows past the thrust bearing 3 just before it is induced to the intake side of the fan 16.

The dotted lines in Fig. 3 represent the zones on the inner walls of the housing 11 against which the body or layer of relatively hotter oil impinges, and thence drains or flows by gravity down to the lower portion thereof in which the relatively cooler and less mobile main body or bulk of oil is contained. Thus, the relatively cooler intake air from the outer atmosphere, coming in through the openings 18, passes along those portions of the walls of the inner housing 11 where the relatively hotter, freer flowing, thinner cross-section of oil impinges; and before the compressive action of the fan 16 has an opportunity to impart a slight additional temperature rise to the body of forcibly circulated air. Discharge passages 19 lead from the outer periphery of the fan 16 to a discharge passageway along the bottom portion of the inner housing 11. Such discharge passageway is defined by the horizontal dividing wall 21 below the bearing 3 and the horizontal dividing walls 22 bridging the spaces between the side walls of the inner housing 11 and outer housing 1. Thus, the discharge air from the fan 16 passes along that portion of the housing 11 in which the main body or bath of oil is contained, substantially as indicated by the arrows in Fig. 4, and is discharged out through the exhaust opening 23 in the outer housing 1 to the atmosphere.

It will thus be seen, that the space surrounding the inner housing 11 is, by virtue of the horizontal dividing walls 21 and 22, separated into an air intake way or duct, designated generally by the letter A, and an air discharge way or duct, designated generally by the letter B. As the air from the passageway A passes through the fan 16 and is transmitted to the discharge passageway B, its direction of flow is turned downwardly through the passages 19 and then reversed to a direction opposite to that in the passageway A. Thus, the circulating air is subjected to an unusual turbulence which causes all portions of the traveling air to be well mixed and dispersed, thereby increasing the efficiency of heat absorption of the circulating air through the unit.

Other modes of applying the principle of the invention may be employed, change being made as regards the details described, provided the features stated in any of the following claims or the equivalent of such be employed.

I therefore particularly point out and distinctly claim as my invention:

1. In a combined machinery housing and lubricant reservoir unit, the combination of air propelling means, a housing wall portion in contact with relatively hot lubricant and a wall portion in contact with cooler lubricant, an air intake passage disposed along a portion of said housing having the hot lubricant and leading from the atmosphere to said air propelling means, and an air discharge passage from said propelling means disposed along the portion of the housing having the cooler lubricant.

2. In a combined machinery housing and lubricant reservoir unit, the upper wall portion of which is contacted by a layer of relatively hotter lubricant and the lower wall portion of which is adapted to contain a body of relatively cooler lubricant, the combination of an air propelling means, an air intake passage disposed along said upper wall portion, and leading from the atmosphere to said air propelling means, and an air discharge passage disposed along said lower wall portion and leading from said air propelling means to atmospheric discharge.

3. In a combined machinery housing and lubricant reservoir unit, the combination of a pair of separate air ducts, one wall of which is formed by the outer surfaces of said housing, a fan having its propelling blades disposed along one side of said housing, and a fan housing completely enclosing said fan with respect to said first-named housing, one of said air ducts leading from the atmosphere to the intake side of said fan, and the other of said air ducts leading from the discharge side of said fan to the atmosphere.

4. In a combined machinery housing and lubricant reservoir unit, the upper wall portion of which is contacted by a layer of relatively hotter lubricant and the lower wall portion of which is adapted to contain a body of relatively cooler lubricant, the combination of a horizontally extending upper air duct, one wall of which is formed by the outer surface of said upper wall portion, a lower air duct parallel to said upper air duct and one wall of which is formed by the outer surface of said lower wall portion, a fan having its propelling blades disposed along one side wall of said housing, and a fan housing completely enclosing said fan with respect to said first-named housing, said upper duct leading from the atmosphere to the intake side of said fan, and said lower air duct leading from the discharge side of said fan to the atmosphere.

5. A reduction gear unit comprising a housing adapted to enclose the gears, and to contain a body of lubricant, a shaft projecting through said housing, a fan mounted on said shaft exteriorly of said housing, an outer wall spaced from said housing, an air intake passage and an air discharge passage formed between said outer wall and said housing, said intake passage leading from the atmosphere to said fan, and said discharge passage leading from said fan to the atmosphere.

6. A reduction gear unit comprising a housing adapted to enclose the gears, and to contain a body of lubricant, a shaft projecting through said housing, a fan mounted on said shaft exteriorly of said housing, an outer wall spaced from said housing and completely enclosing said fan, an air intake passage and an air discharge passage formed between said outer wall and said housing, said intake passage leading from the atmosphere to said fan, and discharge passage leading from said fan to the atmosphere.

7. A reduction gear unit comprising a housing adapted to enclose the gears, and to contain a body of lubricant, a shaft projecting through said housing, a fan mounted on said shaft exteriorly of said housing, an outer wall spaced from said housing along the vertical side walls thereof, and a horizontal wall dividing the space between said housing and said outer wall into upper and lower air passages, said passages extending horizontally along said housing and communicating with said fan, said outer wall having openings at points removed from said fan.

8. A reduction gear unit comprising a housing adapted to enclose the gears, and to contain a body of lubricant, a shaft projecting through said housing, a fan mounted on said shaft exteriorly of said housing, an outer wall spaced from said housing, and completely enclosing said fan, and a horizontal wall dividing the space between said housing and said outer wall into upper and lower air passages, said passages extending horizontally along said housing and communicating with said fan, said outer wall having openings at points removed from said fan, said upper air passage leading from the atmosphere to said fan, and said lower air passage leading from said fan to the atmosphere.

9. A gear reduction unit having a housing whose upper portion is contacted by a layer of relatively hotter lubricant adjacent the zone of contact of the operating gears, and whose lower portion constitutes a reservoir for a body of relatively cooler lubricant, comprising a gear shaft projecting through said housing, a fan mounted on said shaft exteriorly of said housing, a fan housing completely enclosing said fan from the atmosphere, an air intake passage disposed along said upper portion of said first-named housing and leading from the atmosphere to said fan housing, and an air discharge passage disposed along said lower portion of said first-named housing and leading from said fan housing to the atmosphere.

10. A gear reduction unit having a housing whose upper portion is contacted by a layer of relatively hotter lubricant adjacent the zone of contact of the operating gears, and whose lower portion constitutes a reservoir or a bath for a relatively cooler lubricant, comprising a gear shaft projecting through said housing, a fan mounted on said shaft exteriorly of said housing, a fan housing completely enclosing said fan from the atmosphere, an outer wall spaced from said first-named housing, an air intake passage and an air discharge passage formed between said outer wall and said first-named housing, said intake passage leading from the atmosphere to said fan housing and said discharge passage leading from said fan housing to the atmosphere.

WARREN NOBLE.